(12) United States Patent
Horng et al.

(10) Patent No.: US 6,617,730 B2
(45) Date of Patent: Sep. 9, 2003

(54) ROTATION SHAFT SUPPORT STRUCTURE OF MOTOR

(75) Inventors: Alex Horng, Kaohsiung (TW); Ching-Shen Hong, Kaohsiung (TW)

(73) Assignee: Sunonwealth Eletric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/029,271

(22) Filed: Dec. 28, 2001

(65) Prior Publication Data
US 2003/0122437 A1 Jul. 3, 2003

(51) Int. Cl.⁷ .................................................. H02K 7/08
(52) U.S. Cl. ........................................................ 310/90
(58) Field of Search ..................... 310/90, 91; 384/107, 384/121, 124, 420

(56) References Cited

U.S. PATENT DOCUMENTS

| | | | | | |
|---|---|---|---|---|---|
| 3,777,191 A | * | 12/1973 | Papst et al. | ............... | 310/67 R |
| 3,803,432 A | * | 4/1974 | Laing | ............... | 310/90 |
| 3,961,864 A | * | 6/1976 | Papst et al. | ............... | 29/509 |
| 4,517,480 A | * | 5/1985 | Muller | ............... | 310/207 |
| 5,610,462 A | * | 3/1997 | Takahashi | ............... | 310/90 |
| 5,982,064 A | * | 11/1999 | Umeda et al. | ............... | 310/61 |
| 6,290,471 B1 | | 9/2001 | Horng | ............... | 417/354 |

* cited by examiner

Primary Examiner—Nestor Ramirez
Assistant Examiner—Nguyen Hanh
(74) Attorney, Agent, or Firm—Bacon & Thomas, PLLC

(57) ABSTRACT

A rotation shaft support structure of a motor includes a shaft tube having an inner wall provided with at least one bearing. A seal member made of metallic material is securely combined on one end of the shaft tube. A support member made of a wear resistant non-metallic material is supported by the seal member. The support member has a resting portion, and one end of the rotation shaft may be rested on the resting portion to rotate in the bearing.

7 Claims, 4 Drawing Sheets

ROTATION SHAFT SUPPORT STRUCTURE OF MOTOR

BACKGROUND OF THE INVENTION

1. Field of the Invention

The present invention relates to a rotation shaft support structure of a motor, and more particularly to a rotation shaft support structure of a motor, wherein the rotation shaft of a rotor of the motor has an end face rested on a support member, so that the rotor may form a stable rotation.

2. Description of the Related Art

U.S. Pat No. 6,290,471, issued on Sep. 18, 2001 to Horng, entitled by "Pivotal Structure for an Impeller of a Miniature Heat Dissipating Fan", comprises a casing provided with a shaft tube, a stator coil seat, a circuit board, and a balance plate. The shaft tube is provided with one or two bearings. The shaft of the impeller is pivoted in the shaft hole of the bearing. The end face of the shaft is rested on the closure member of the shaft tube. The annular magnet of the impeller may be induced with the stator coil seat and may attract the balance plate, so that the impeller may be rotated along a fixed track.

If the closure member of the shaft tube is made of metallic material, the closure member and the shaft tube may have a better combination. However, when the end face of the shaft of the impeller is rested on the closure member to rotate, friction noise is produced. If the closure member of the shaft tube is made of non-metallic material, when the end face of the shaft of the impeller is rested on the closure member to rotate, the friction noise may be reduced. However, the closure member made of non-metallic material cannot be combined with the shaft tube securely.

SUMMARY OF THE INVENTION

The primary objective of the present invention is to provide a rotation shaft support structure of a motor, wherein the rotation shaft of a rotor of the motor has an end face rested on a support member which may be stably and rigidly combined in the inner wall of the shaft tube to form a positioning effect.

In accordance with the present invention, there is provided a rotation shaft support structure of a motor including a shaft tube having an inner wall provided with at least one bearing. A seal member made of metallic material is securely combined on one end of the shaft tube. A support member made of a wear resistant non-metallic material is supported by the seal member. The support member has a resting portion, and one end of the rotation shaft may be rested on the resting portion to rotate in the bearing.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
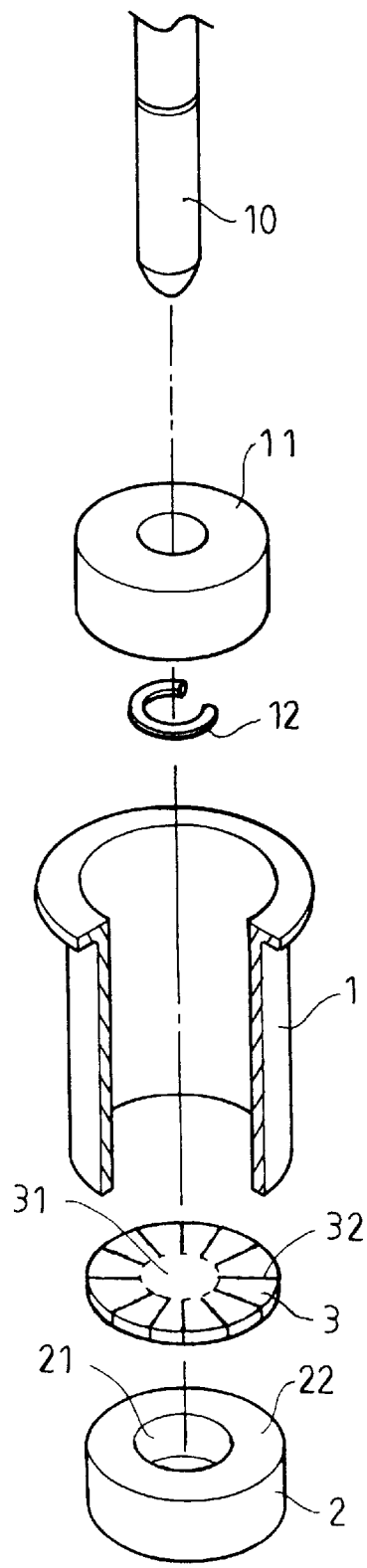
FIG. 1 is an exploded perspective view of a rotation shaft support structure of a motor in accordance with a first embodiment of the present invention.

Referring to the drawings and initially to FIG. 1, a rotation shaft support structure of a motor in accordance with a first embodiment of the present invention comprises a shaft tube 1, a seal member 2, and a support member 3.

The shaft tube 1 may be a conventional metallic tube. At least one bearing 11 is placed in the shaft tube 1, for supporting a rotation shaft 10 of a rotor to rotate. A snapping member 12 is snapped on the rotation shaft 10 of the rotor, thereby preventing detachment of the rotation shaft 10 of the rotor. The shaft tube 1 has one end face combined with the seal member 2.

The seal member 2 is made of metallic material. Thus, the seal member 2 and the shaft tube 1 may be securely combined in a close fit manner. The seal member 2 may be provided with a recess 21 which has a periphery formed with an annular wall 22.

The support member 3 is made of a wear resistant non-metallic material. The support member 3 has a resting portion 31 on which the end face of the rotation shaft 10 of the rotor may be rested. In the preferred embodiment of the present invention, the area of the resting portion 31 of the support member 3 is slightly smaller than that of the recess 21 of the seal member 2. The resting portion 31 of the support member 3 has a periphery provided with multiple separable plates 32. Thus, the multiple separable plates 32 of the support member 3 may be bent and may be supported in the inner wall of the recess 21 of the seal member 2, so that the resting portion 31 of the support member 3 may be placed and positioned in the recess 21 of the seal member 2.

Figure 2:
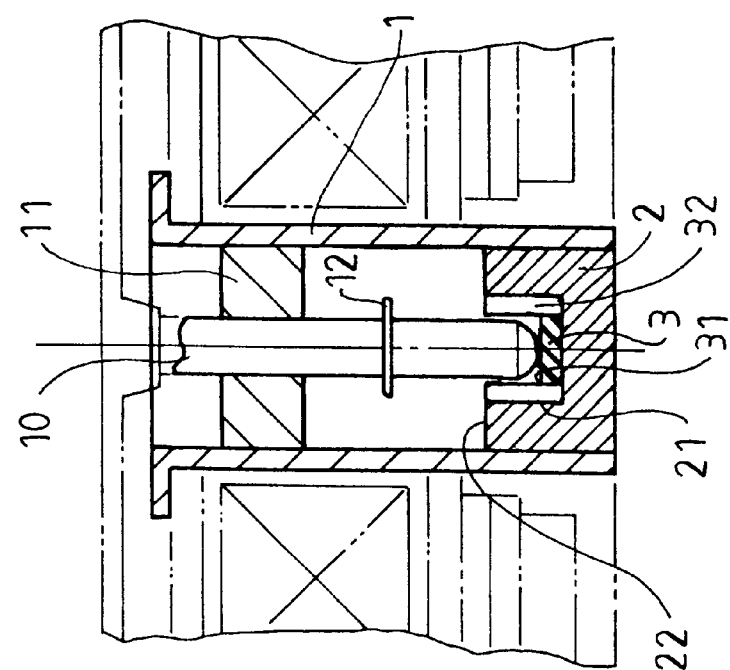
FIG. 2 is a front plan cross-sectional assembly view of the rotation shaft support structure of a motor as shown in FIG. 1.

Referring to FIG. 2, the shaft tube 1 has one end combined with the seal member 2. The seal member 2 is made of metallic material. Thus, the seal member 2 and the shaft tube 1 may be securely combined in a close fit manner. The support member 3 may be placed in the recess 21 of the seal member 2, and the multiple separable plates 32 of the support member 3 may be bent and may be securely rested on the inner wall of the recess 21 of the seal member 2, so that the support member 3 may be rigidly positioned in the shaft tube 1 by resting of the seal member 2, and may be rested on one end of the rotation shaft 10. The area circled by the multiple separable plates 32 of the support member 3 is slightly greater than the outer diameter of the rotation shaft 10. The outer wall of the rotation shaft 10 is provided with the bearing 11 which may support the rotation shaft 10 to rotate. Further, the support member 3 is made of a wear resistant non-metallic material. Thus, the rotation shaft 10 rested on the resting portion 31 of the support member 3 may have a more smooth rotation. In addition, the noise of friction produced between the rotation shaft 10 and the resting portion 31 of the support member 3 during rotation of the rotation shaft 10 may be reduced to the minimum.

Figure 4:
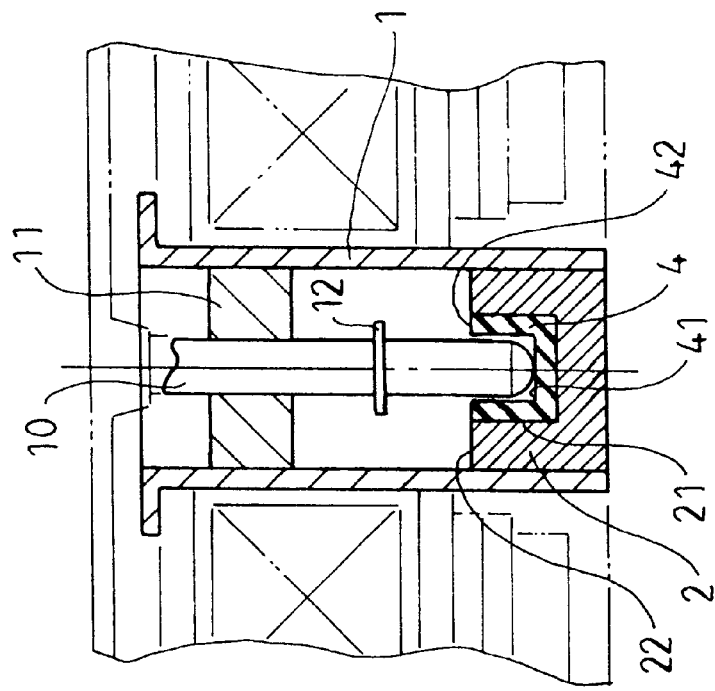
FIG. 4 is a front plan cross-sectional assembly view of the rotation shaft support structure of a motor as shown in FIG. 3.
Figure 3:
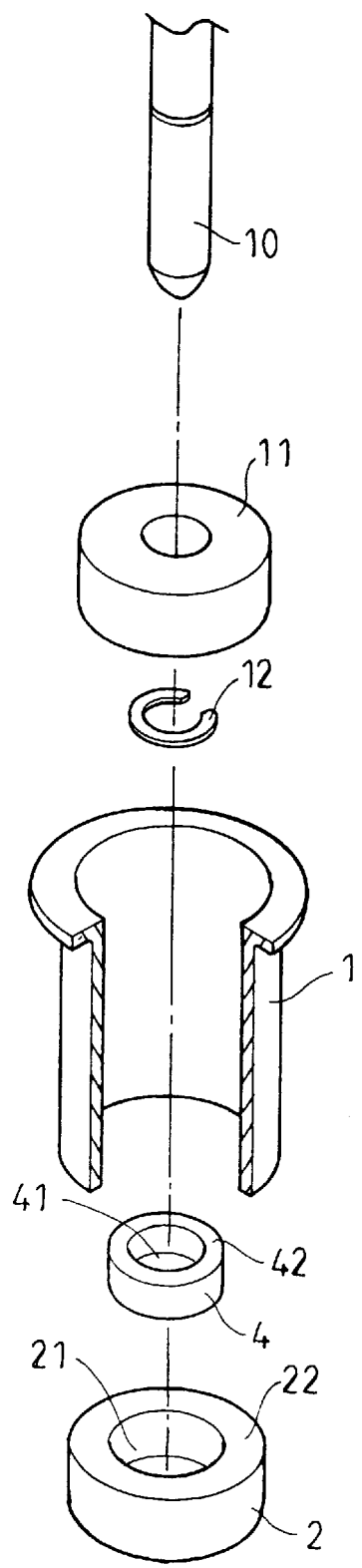
FIG. 3 is an exploded perspective view of a rotation shaft support structure of a motor in accordance with a second embodiment of the present invention.

Referring to FIGS. 3 and 4, a rotation shaft support structure of a motor in accordance with a second embodiment of the present invention comprises a shaft tube 1, a seal member 2, and a single support member 4.

At least one bearing 11 is mounted in the inner wall of the shaft tube 1, for supporting a rotation shaft 10 of a rotor to rotate. A snapping member 12 is snapped on the rotation shaft 10 of the rotor, thereby preventing detachment of the rotation shaft 10 of the rotor. The shaft tube 1 has one end combined with the seal member 2. The seal member 2 is made of metallic material. The seal member 2 may be provided with a recess 21 for placing the support member 4. The recess 21 has a periphery formed with an annular wall 22.

The support member 4 is made of a wear resistant non-metallic material. The support member 4 is placed in the recess 21 of the seal member 2. The support member 4 is formed with a cup-shape or a bowl-shape. The bottom of the support member 4 has an integral periphery provided with an annular wall 42 that faces a radial surface of the rotating shaft 10. The area circled by the annular wall 42 of the support member 4 is slightly greater than the outer diameter of the rotation shaft 10.

Referring to FIG. 4, the rotation shaft support structure of a motor in accordance with a second embodiment of the present invention is assembled. At least one bearing 11 is mounted in the inner wall of the shaft tube 1 which has one end combined with the seal member 2 that is made of metallic material. Thus, the seal member 2 and the shaft tube 1 may be securely combined in a close fit manner. The support member 4 may be placed in the recess 21 of the seal member 2. The rotation shaft 10 is passed through the bearing 11, and one end of the rotation shaft 10 is rested on the resting portion 41 of the support member 4. Thus, the rotation shaft 10 may have a stable rotation. In addition, the support member 4 is made of a wear resistant non-metallic material. Thus, the noise of friction produced between the rotation shaft 10 and the resting portion 41 of the support member 4 during rotation of the rotation shaft 10 may be reduced to the minimum.

Figure 5:
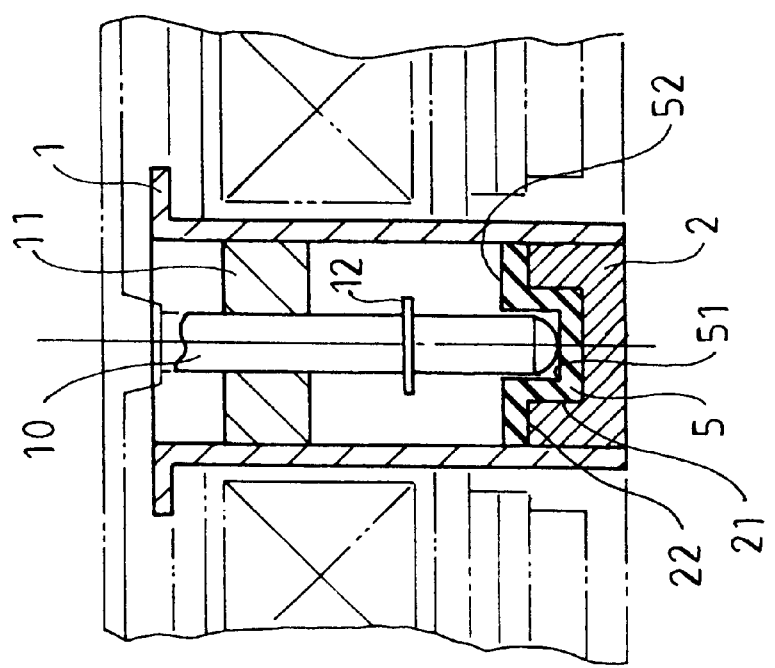
FIG. 5 is a front plan cross-sectional assembly view of a rotation shaft support structure of a motor in accordance with a third embodiment of the present invention.

Referring to FIG. 5, a rotation shaft support structure of a motor in accordance with a third embodiment of the present invention is assembled. At least one bearing 11 is mounted in the inner wall of the shaft tube 1 which has one end combined with the seal member 2 that is made of metallic material. Thus, the seal member 2 and the shaft tube 1 may be securely and rigidly combined in a close fit manner. The support member 5 is placed in the recess 21 of the seal member 2. The support member 5 is formed with an inverted hat-shape. The support member 5 may be formed with a resting portion 51 on which one end of the rotation shaft 10 of the rotor may be rested. The resting portion 51 has a periphery protruded with an annular lip 52 that may be locked on the annular wall 22 of the seal member 2. The rotation shaft 10 is passed through the bearing 11, and one end of the rotation shaft 10 is rested on the resting portion 51 of the support member 5. Thus, the rotation shaft 10 may have a stable rotation. In addition, the support member 5 is made of a wear resistant non-metallic material. Thus, the noise of friction produced between the rotation shaft 10 and the resting portion 51 of the support member 5 during rotation of the rotation shaft 10 may be reduced to the minimum.

Figure 6:
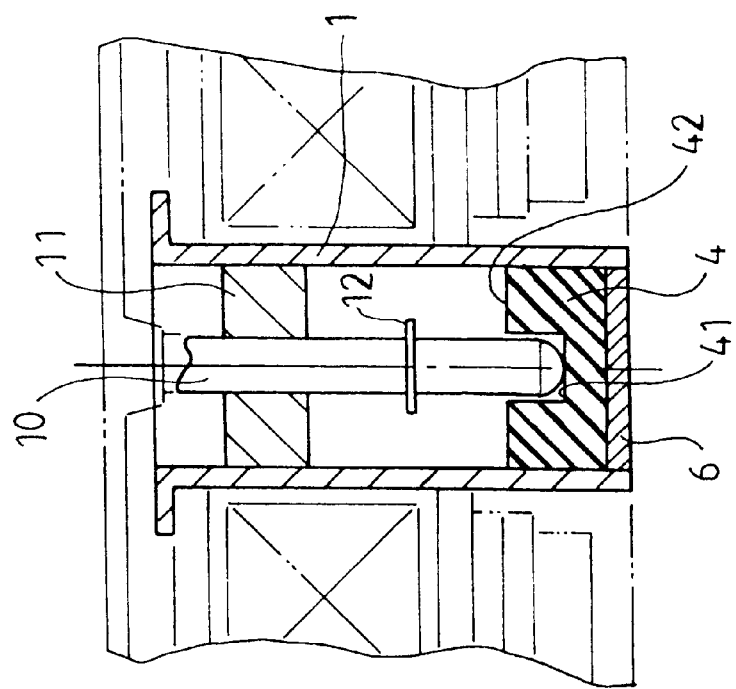
FIG. 6 is a front plan cross-sectional assembly view of a rotation shaft support structure of a motor in accordance with a fourth embodiment of the present invention.

Referring to FIG. 6, a rotation shaft support structure of a motor in accordance with a fourth embodiment of the present invention is assembled. At least one bearing 11 is mounted in the inner wall of the shaft tube 1 which has one end combined with a plate-shaped seal member 6 that is made of metallic material. Thus, the seal member 6 and the shaft tube 1 may be securely and rigidly combined in a close fit manner. The support member 4 may be placed on the seal member 6. The support member 4 is formed with a cup-shape or a bowl-shape. The bottom of the support member 4 may be formed with a resting portion 41. The resting portion 41 of the support member 4 has a periphery provided with an annular wall 42. The area circled by the annular wall 42 of the support member 4 is slightly greater than the outer diameter of the rotation shaft 10. The rotation shaft 10 is passed through the bearing 11, and one end of the rotation shaft 10 is rested on the resting portion 41 of the support member 4. Thus, the rotation shaft 10 may have a stable rotation. In addition, the support member 4 is made of a wear resistant non-metallic material. Thus, the noise of friction produced between the rotation shaft 10 and the resting portion 41 of the support member 4 during rotation of the rotation shaft 10 may be reduced to the minimum.

Thus, in the rotation shaft support structure of a motor of the present invention, the seal member is made of metallic material. Thus, the seal member and the inner wall of the shaft tube may be securely and rigidly combined in a close fit manner, and the seal member may support the support member stably and rigidly. Thus, when one end of the rotation shaft is rested on the support member during rotation, the rotation shaft may have a stable and rigid rotation. In addition, when the rotation shaft is rotated, the noise of friction may be reduced to the minimum.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A rotation shaft support structure of a motor, comprising:
    a shaft tube, having an inner wall provided with at least one bearing in which a rotation shaft may be rotated;
    a seal member, made of metallic material and securely combined with one end of the shaft tube; and
    a single support member, made of a wear resistant non-metallic material, mounted in the one end of the shaft tube, and supported by the seal member, the support member having an annular wall and a resting portion which has an integral periphery from which the annular wall extends,
    wherein an end of the shaft is inserted through the annular wall, and
    wherein the shaft is adapted to face a radial surface of the rotation shaft for radially supporting the rotation shaft while one end of the rotation shaft rests on the resting portion.

2. The rotation shaft support structure of a motor as claimed in claim 1, wherein the seal member has a recess and has a periphery provided with an annular wall, and the support member may be placed in the recess.

3. The rotation shaft support structure of a motor as claimed in claim 2, wherein the annular wall of the support member is formed by multiple separable plates which may be bent and may be rested on the inner wall of the seal member.

4. The rotation shaft support structure of a motor as claimed in claim 1, wherein the area circled by the annular wall of the support member is slightly greater than the outer diameter of the rotation shaft.

5. The rotation shaft support structure of a motor as claimed in claim 1, wherein the support member is formed with a cup-shape or a bowl-shape.

6. The rotation shaft support structure of a motor as claimed in claim 1, wherein the support member is formed with an inverted hat-shape, and has a resting portion and an annular lip.

7. The rotation shaft support structure of a motor as claimed in claim 2, wherein the annular lip of the support member is rested on the annular wall of the seal member.

* * * * *